US008596693B2

(12) United States Patent
Meyer et al.

(10) Patent No.: US 8,596,693 B2
(45) Date of Patent: Dec. 3, 2013

(54) LOCKING UNIT

(75) Inventors: Eddy Meyer, Rathenow (DE); Karel Erben, Mlada Boleslav (CZ)

(73) Assignees: Edscha Engineering GmbH, Remscheid (DE); Skoda Auto A.S., Mlada Boleslav (CZ)

( * ) Notice: Subject to any disclaimer, the term of this patent is extended or adjusted under 35 U.S.C. 154(b) by 783 days.

(21) Appl. No.: 12/085,591

(22) PCT Filed: Nov. 30, 2006

(86) PCT No.: PCT/DE2006/002120
§ 371 (c)(1),
(2), (4) Date: Apr. 21, 2009

(87) PCT Pub. No.: WO2007/062635
PCT Pub. Date: Jun. 7, 2007

(65) Prior Publication Data
US 2009/0218827 A1    Sep. 3, 2009

(30) Foreign Application Priority Data
Nov. 30, 2005 (DE) .......................... 10 2005 057 425

(51) Int. Cl.
*E05C 3/06* (2006.01)
(52) U.S. Cl.
USPC .............................. 292/198; 292/201; 292/216
(58) Field of Classification Search
CPC ..... E05B 53/003; E05B 13/002; E05B 65/08; E05B 81/14; E05B 85/26
USPC ................... 292/95, 113, 114, 201, 216, 280, 292/DIG. 23, DIG. 42, 56, 112, 160, 172, 292/142, 146, 194, 199, 203, DIG. 43
See application file for complete search history.

(56) References Cited

U.S. PATENT DOCUMENTS 3,735,833 A * 5/1973 Sutkowski .................... 180/289
4,936,611 A * 6/1990 Palvolgyi ......................... 292/28
(Continued)

FOREIGN PATENT DOCUMENTS

CA    2 274 069     6/1998
DE    33 37 202     4/1985
(Continued)

OTHER PUBLICATIONS

See Search Report of the International Application No. PCT/DE2006/002120.

*Primary Examiner* — Kristina Fulton
*Assistant Examiner* — Nathan Cumar
(74) *Attorney, Agent, or Firm* — Davidson, Davidson & Kappel, LLC

(57) ABSTRACT

The invention relates to a locking unit for a first flap, a second flap and a carrier, comprising a locking element which can be housed in a displaceable manner on the first flap and which comprises a tappet, and a driveable actuation device which is used to displace the locking element. In a first position, said locking element couples the first flap to the second flap in order to form a unit, and in a second position, the first flap is released from the second flap, and in an intermediate position, the first flap and the second flap are fixed together in the carrier. An active connection between the tappet of the locking element and the actuation element can be formed in said intermediate position.

20 Claims, 15 Drawing Sheets

(56) References Cited

U.S. PATENT DOCUMENTS

| | | | |
|---|---|---|---|
| 4,995,658 A * | 2/1991 | Shiraki et al. | 292/336.3 |
| 5,118,146 A * | 6/1992 | Watanuki | 292/216 |
| 5,295,374 A * | 3/1994 | Bender et al. | 70/208 |
| 5,584,515 A * | 12/1996 | Silye | 292/201 |
| 6,149,210 A * | 11/2000 | Hunt et al. | 292/216 |
| 6,158,788 A * | 12/2000 | Ikeda et al. | 292/216 |
| 6,256,932 B1 * | 7/2001 | Jyawook et al. | 49/503 |
| 6,386,599 B1 | 5/2002 | Chevalier | |
| 6,666,483 B2 * | 12/2003 | Baniak et al. | 292/123 |
| 6,758,513 B2 * | 7/2004 | Choo | 296/146.8 |
| 6,761,383 B2 * | 7/2004 | Ju | 292/216 |
| 6,948,745 B2 | 9/2005 | Chevalier | |

FOREIGN PATENT DOCUMENTS

| | | |
|---|---|---|
| DE | 196 15 540 | 4/1997 |
| DE | 198 08 374 | 9/1999 |
| DE | EP 0718134 * | 10/1999 |
| DE | 10 2006 013 735 | 10/2006 |
| EP | 0 095 988 | 12/1983 |
| EP | 0 718 134 | 12/1995 |
| EP | 0 718 134 * | 10/1999 |
| EP | 1 518 982 B1 | 7/2009 |
| RU | 2 194 837 C2 | 12/2002 |

* cited by examiner

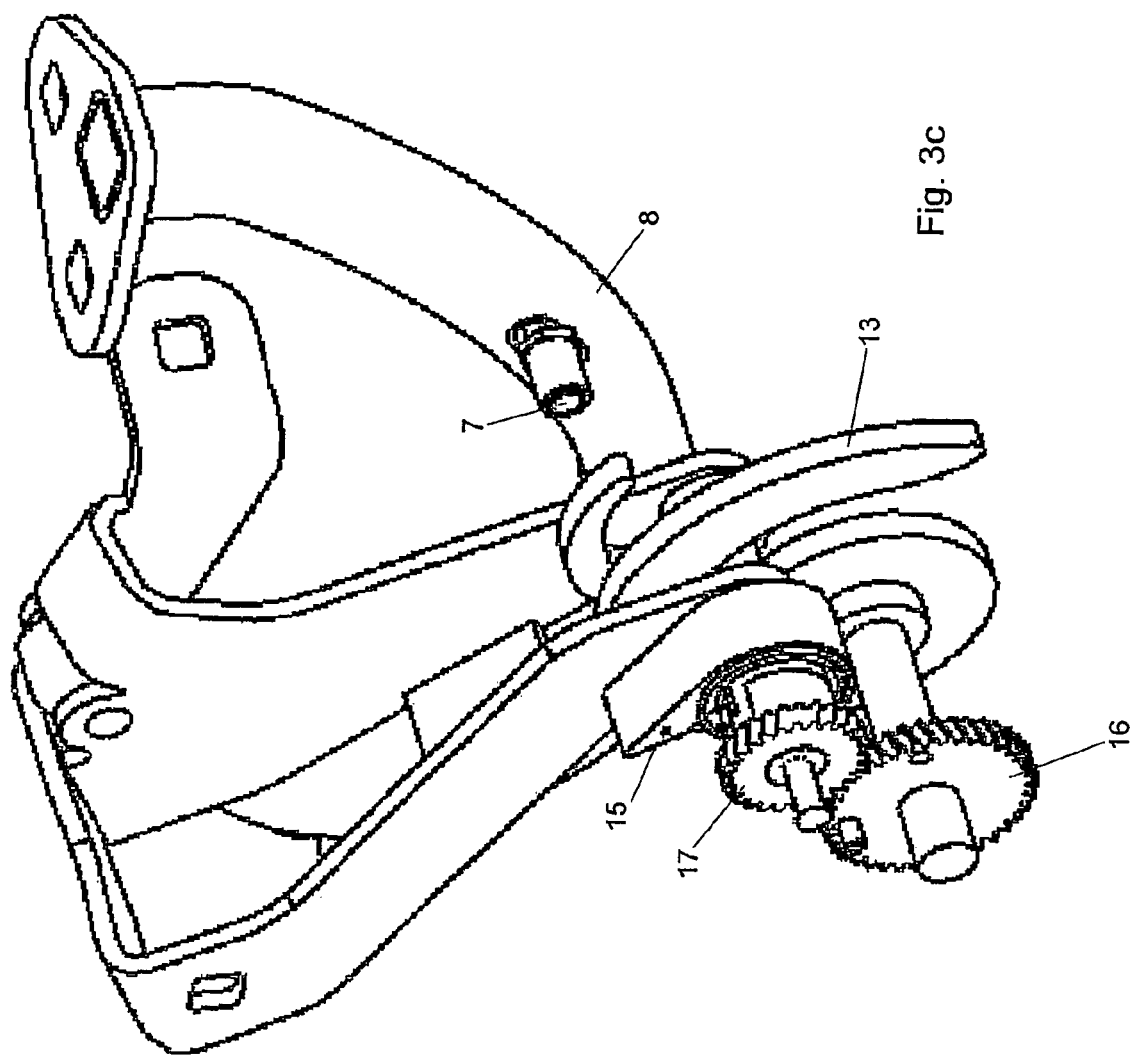

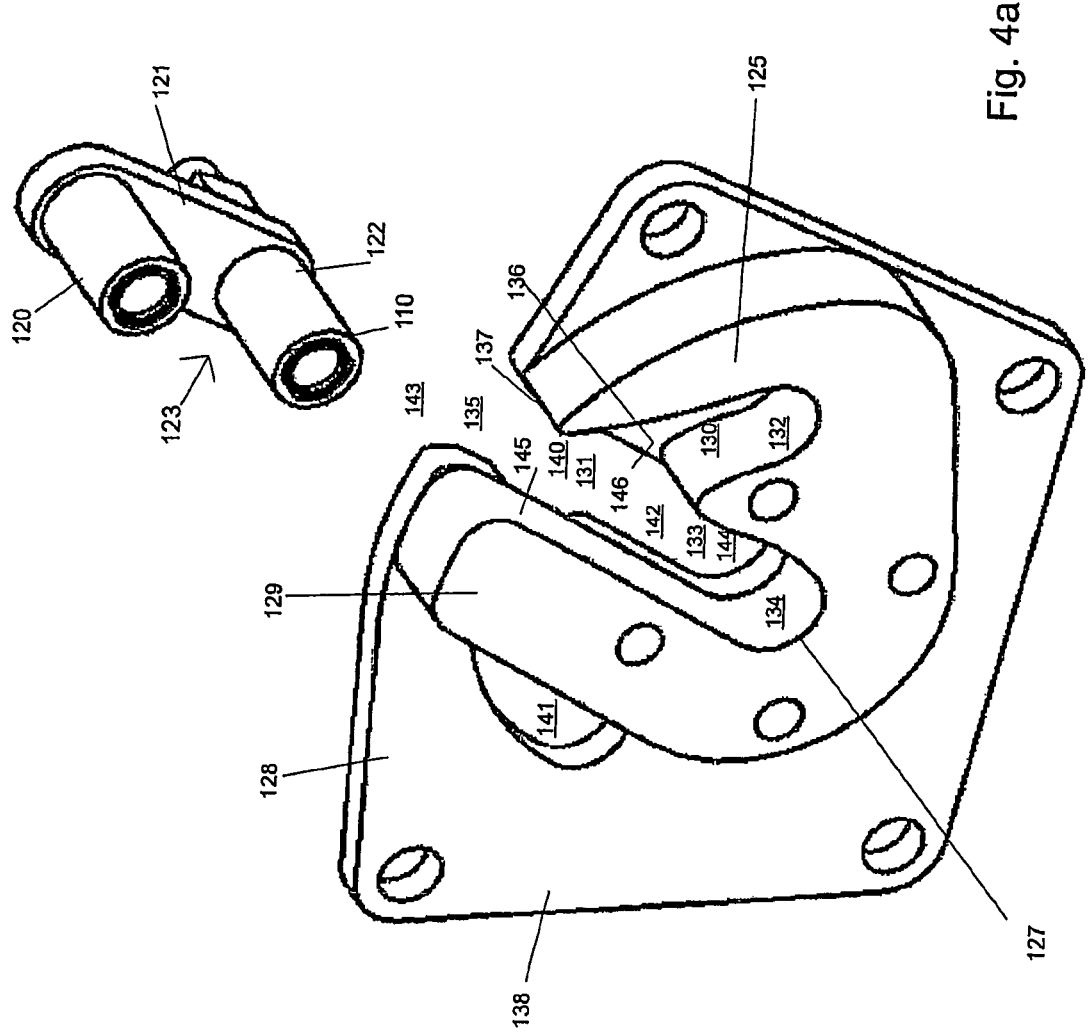

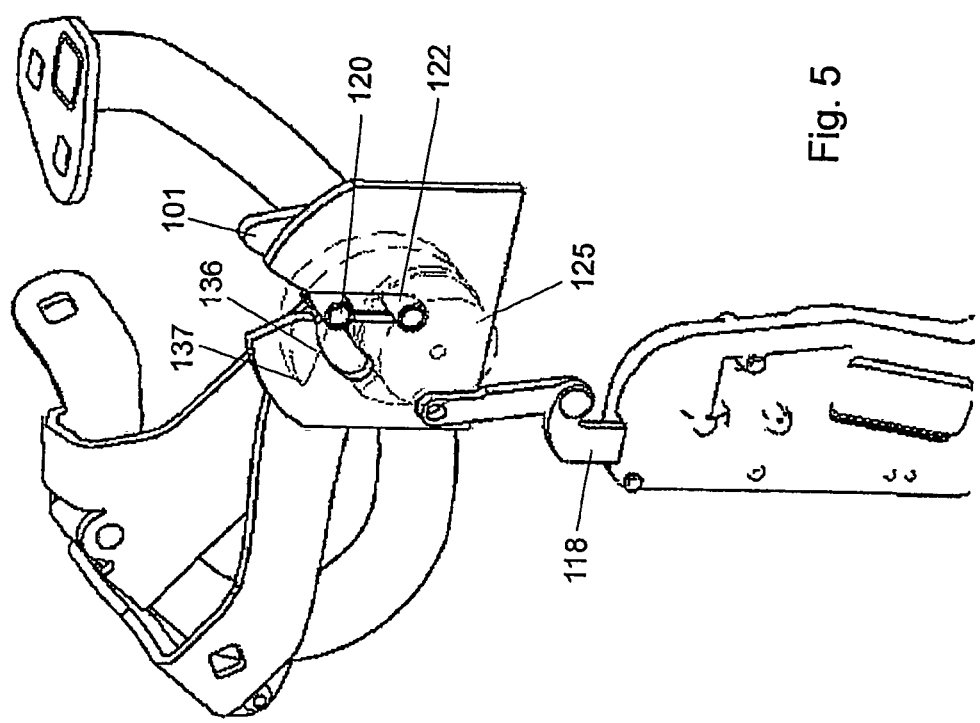

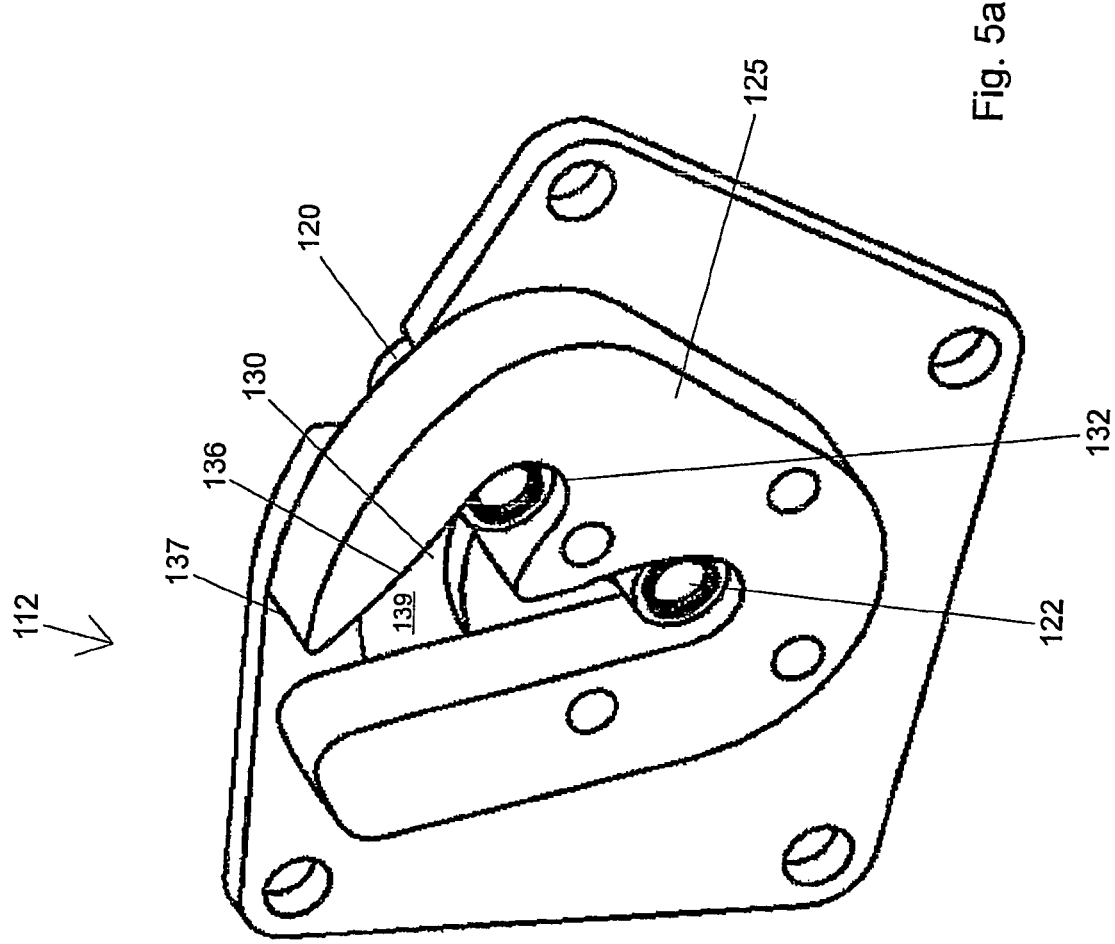

LOCKING UNIT

The invention relates to a locking unit according to the present invention for a first flap, a second flap and a support.

BACKGROUND

DE 10 2006 013 735 A1, published after the priority date of the present application, shows a locking unit, in which the first flap is designed as a tailgate of a motor vehicle, the second flap is designed as a trunk flap of the motor vehicle and the support is designed as the bodywork of the motor vehicle, wherein, in a first position, the trunk flap can be coupled to the tailgate to form a unit, and therefore the unit comprising the tailgate and the trunk flap is articulated on the bodywork in a manner such that it can pivot about a tailgate axis. In a second position, the tailgate is fixed to the bodywork, with the trunk flap on the tailgate being pivotable about a trunk flap axis in order only to open up the trunk. The trunk flap is articulated rotatably via a pivoting arm, wherein a laterally protruding journal is arranged on the pivoting arm, and wherein, in the first position, the journal is engaged around by a locking element. The locking element comprises a pin, an elongate portion in the form of a hook which directly surrounds the journal, and a driver in the form of a guide element, which acts as a lever, with a longitudinal extent in a direction perpendicular to the axis of rotation. An actuating unit which comprises a U-shaped receptacle is provided for actuating the locking element, with the guide element engaging in an essentially form-fitting manner in the U-shaped receptacle in order to produce an operative connection between the actuating device and the locking element. The actuating device furthermore comprises a pivoting hook with an indentation. The U-shaped receptacle is fastened to a first driving means of a double mechanism, and the pivoting hook is fastened to a second driving means of a double mechanism. For the actuation of the locking element, the guide element therefor engages in the U-shaped receptacle of the actuating device and said actuating device rotates the locking element in a first direction of rotation, and, furthermore, the pivoting hook is rotated in a second direction of rotation in such a manner that it engages over the pin of the locking element. One drawback is that the actuating device is overall of multi-part and complicated construction, with a further drawback being that the locking element assigned to the actuating device likewise has to be of complicated configuration. Yet another drawback is that the locking unit is prone to failure; in particular, the double mechanism, in a configuration as a mechanism with gearwheels, can rapidly fail in the event of damage or of the penetration of a foreign body. Another drawback is that only a very indirect operative connection can be produced between the locking element and the drive, via the double mechanism, the U-shaped receptacle and the guide element of the locking element, and therefore a powerful driving device is required, a comparatively high degree of wear occurs and, over time, tolerances can accumulate to form an undesirable amount of play. Another drawback is that a high amount of torque has to be exerted on the guide element of the locking element in order to rotate the locking element, and therefore high mechanical loads occur. Better torque ratios require a significant longitudinal extent of the guide element, but the locking unit would take up a large amount of installation space as a result. A further drawback is that, due to the pin, the guide element is at a distance from the locking element and the pivoting hook is at a distance from the guide element, and therefore the locking unit overall needs a large amount of space, in particular in a direction defined by the pin.

EP 0 718 134 B1=DE 695 12 749 T2 shows a vehicle with a divided tailgate which has a first flap part provided with a rear window and a second flap part designed as a trunk lid. The first flap part is articulated on the bodywork in a manner such that it can pivot about a pivot axis. In a region facing away from the pivot axis, a plate is fastened to the first flap part, which plate protrudes over the lower edge of said flap part and at which the second flap part is articulated pivotably on the first flap part via a four-bar linkage. The second flap part is conventionally lockable to the bodywork. In the event that only the second flap part is to be opened, the first flap part can be fixed in a hook of the bodywork via a laterally protruding journal. One drawback here is that, when the flap parts are open together, they are no longer fixed relative to each other, and therefore a pivoting of the two flap parts relative to each other is possible. Furthermore, the tailgate requires two separate gas-filled compression springs as supporting means.

DE 196 15 540 A1 describes a pivotable tailgate with an encircling frame in which a rear window and a loading flap are accommodated and are mounted in a manner such that they can be pivoted separately from the tailgate. In this case, conventional locking means are provided in each case for the locking of the rear window and the loading flap to the frame and relative to each other.

DE 198 08 374 A1 describes a means of locking a flap of a motor vehicle, such as, for example, the front lid of a motor vehicle. In this case, the bow of a lock, which is arranged on the bodywork and the axis of which is essentially perpendicular to the pivot axis of the flap, is engaged around by a locking device, which is arranged on the flap, in order to lock the flap. The locking device comprises a rotary latch and a fork which are both pivotably mounted adjacent to each other on a common, first axis and grasp the bow by means of respectively provided openings. A first drive drives the bow latch by a gearwheel mechanism for rotation about the first axis. The bow latch carries along the fork in its rotational movement in a form-fitting manner by means of an offset and pivots into a parking position which is rotated through approximately 180° and in which the parts of the locking device no longer protrude over the border of the flap. Bow latch and fork are held in their locked position by a respectively assigned pawl and are both mounted on a common, second axis and can be pivoted by a second drive.

DE 33 37 202 A1 describes a means of locking a flap of a motor vehicle, such as, for example, the front lid of a motor vehicle. In this case, the bow of a lock, which is arranged on the flap, is engaged around by a locking device, which is arranged on the flap, in order to lock the flap. The locking device can be pivoted on an axis which is prestressed in the direction of a release position by a spring. The locking device has a main sliding track for the guide of the bow, the lower end of which track defines the closed position and the upper end of which merges into a lower edge which defines a stop and springs back in the manner of a hook. An upper edge of the hook serves as an introductory aid for the bow, and therefore, after the tip of the hook is exceeded in the course of the closing movement, the spring pivots the locking device in such a manner that the bow comes to bear against the main sliding track and, by further lowering, pivots the locking device again counter to the prestressing of the spring until the bow reaches the closed position. By means of a secondary sliding track which is formed essentially opposite the main sliding track, it is ensured that, during the opening operation, the locking device is pivoted, even if the spring should fail, in such a manner that the bow passes under the stop. An introductory sliding track which is formed on the side of the secondary sliding track, points upward and merges into the secondary sliding track in a manner similar to a wedge ensures that the locking device which is not oriented in the release position should the spring fail is pivoted by the bow striking against it in such a manner that the latter passes again into the region of the main sliding track.

SUMMARY OF THE INVENTION

It is the object of the invention to provide a locking device which is constructed in a simple manner and is reliable in operation.

This object is achieved according to the invention for the locking unit by the characterizing features of claim 1 as follows.

By the driver being held in an elongated hole of the locking disk which is then moved relative to the initially stationary driver, it is ensured that a force is exerted on the driver and therefore an operative connection between the actuating device and the locking element is produced only when the driver is arranged at the second end of the elongated hole, as a result of which an inadvertent emergence of the driver from the elongated hole can be avoided. In particular, the coupling between the second flap and the first flap is released only when it is imparted, by means of the driver which is held securely in the elongated hole, that the first flap is held on the support, and therefore a release of the second flap from the first flap and from the support at the same time can be reliably and simply prevented.

The locking disk is simple to fit, and therefore the locking unit only comprises a few individual parts. In particular, it is advantageous that, in a single movement in a first movement phase, the locking disk permits the second flap to be fixed on the support and, in a continuation of the movement in a second movement phase, permits release of the second flap from the first flap to be carried out. Such a sequence of movement can easily be controlled, does not require a complicated mechanism and can easily be monitored.

Furthermore, it is advantageous that, in the intermediate position, the driver of the locking element, which driver is held at the second end of the elongated hole, brings about an essentially direct coupling, without further intermediate steps, between the drive of the locking disk and the locking element to be actuated.

It is furthermore advantageous that the locking unit is of robust and compact configuration and, in particular, can be provided as a premanufactured unit.

In addition to the locking disk, the locking unit preferably comprises a locking plate which is fastened to the support and has a bore which is at least partially passed through by the driver, and therefore, in addition to the guidance made possible by the elongated hole of the locking disk, provides a further possibility of preventing the driver from breaking out of a predetermined trajectory, and therefore, furthermore, in the second position, the drive can be switched off and the driver and, by means of thereof, the locking element can be fixed to the support by means of the locking plate. The profile of the bore of the locking plate is then provided by the trajectory described by the guided driver.

The locking disk is preferably mounted on the support in a manner such that it can rotate about a locking disk axis, and therefore the movement of the locking disk essentially corresponds to a simply activatable rotational movement about a maximum angle.

The locking element preferably has a lever with a lever axis, and the driver is designed as a handle of the lever, as a result of which the locking element can be actuated in a simple manner.

If the lever axis of the lever is arranged as an extension of the locking disk axis, it is ensured that the lever can only be actuated if a force acts on the handle of the lever and interfering effects are reduced by friction between the driver, which is designed as the handle of the lever, and the elongated hole of the locking disk, which hole receives the handle. The elongated hole is preferably configured in such a manner, for example by means of a formation of an introductory edge or a guide surface at the open end of the elongated hole, that, in a first section of the rotation of the locking disk, the two axes are brought into overlap while the bolt is pulled into the locking plate counter to the mechanical resistance, for example of a trunk seal.

The locking disk preferably comprises a blind hole which is connected at a first end to the elongated hole, the blind hole, at a second, closed end, receiving a further guide means of the locking element, which guide means is provided in addition to the driver, and a defined, reproducible alignment of the locking element relative to the actuating unit being possible. If, in particular, a handle is provided as the driver, the further guide means can be designed as a guide pin which is connected fixedly to the driver.

At the first end, the elongated hole preferably has a guide surface with which the driver, which is arranged at the first end of the elongated hole in the first position, interacts during the further course of the movement of the locking disk. In particular, it can be provided to configure the guide surface in such a manner that the elongated hole tapers in the vicinity of the first end such that the driver can be reliably inserted into the elongated hole and tolerances which may occur in the relative position between the driver and the first end of the elongated hole are compensated for.

As an alternative to a rotatable locking element, the locking element can be mounted in a longitudinally displaceable manner, for example as a slide which is accommodated on the first flap and, in the first position, couples the first flap to the second flap by the slide passing through a section of the second flap. If the locking element is designed as a slide, the driver can be designed as a pin which protrudes laterally from the said locking element and is received and guided by the elongated hole.

Further advantages and features of the invention emerge from the description below of preferred exemplary embodiments and from the dependent claims.

BRIEF DESCRIPTION OF THE DRAWINGS

The invention is described and explained in more detail below using two exemplary embodiments of a locking unit according to the invention and with reference to the attached drawings.

FIG. 3c shows a perspective view of the actuating device from FIG. 2 in a second position, FIG. 4a shows a perspective view of an enlarged detail of the first exemplary embodiment from FIG. 4, FIG. 5 shows a perspective view of the first exemplary embodiment from FIGS. 4 and 4a in an intermediate position, FIG. 5a shows a perspective view of an enlarged detail of the first exemplary embodiment from FIG. 5.

DETAILED DESCRIPTION

It should be mentioned first that, for FIG. 1 to FIG. 9, the support is in each case designed as the bodywork of a motor vehicle, the first flap is in each case designed as a tailgate which is articulated in a manner such that it can rotate about a tailgate axis (not illustrated) on the bodywork, and the second flap is designed as a trunk flap, with the trunk flap being articulated in a manner such that it can rotate about an indicated trunk flap axis (axis 258 in FIG. 9) on the tailgate. The locking unit is spaced apart from the tailgate axis and from the trunk flap axis. If, in the first position of the locking unit, the tailgate is coupled to the trunk flap, then said assembly is also rotatable as a unit about the tailgate axis. If, in the second position, the trunk flap is decoupled from the tailgate, then the tailgate is fixed to the bodywork in the region of the locking unit and the tailgate axis is no longer rotatable with respect to the bodywork. By contrast, in the second position, the trunk flap is articulated in a manner such that it can rotate about the trunk flap axis on the tailgate.

Figure 1A:
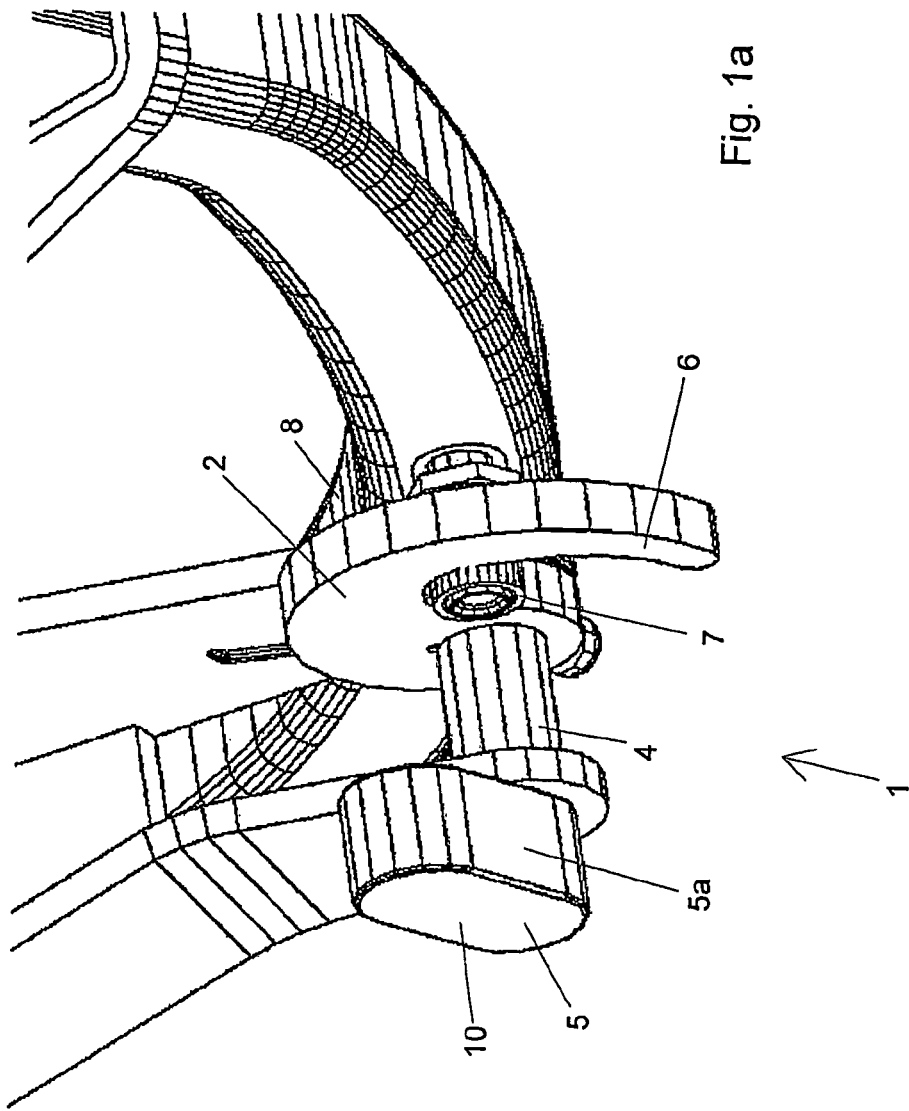
FIG. 1a shows a perspective view of a locking element, which is equipped with a mechanism, of a locking unit.

FIG. 1a shows a locking element 1 of a locking unit. The locking element 1 comprises an essentially disk-shaped body 2 with an introductory slot 3. The locking element 1 furthermore comprises a pin 4 which protrudes essentially perpendicularly from the body 2, with a guide element 5 being provided at one end of the pin 4, said guide element having a longitudinal extent such that side surfaces 5a of the guide element 5 are designed as guide surfaces. The guide element 5 is connected in a rotationally fixed manner to the body 2 of the locking element 1 via the pin 4 and is spaced apart from the body 2. A curved, elongate section 6 is formed on the body 2 adjacent to the introductory slot 3.

FIG. 1a shows the locking element 1 in a position in which the elongate section 6 engages around a journal 7 in the manner of a hook, the journal 7 being arranged at one end of the introductory slot 3. The journal 7 is fastened to an arm 8 (only partially illustrated) of a second flap (not illustrated in FIG. 1a). The journal 7 defines a journal axis 9 and the pin 4 defines a lever axis 10 which is spaced apart from the journal axis 9, and therefore a rotation of the locking element 1 about the lever axis 10 brings the journal 7 out of engagement with the introductory slot 3 and also releases it with respect to the elongate section 6. The locking element 1 is held on a projection 11 of a first flap (not illustrated specifically in FIG. 1a) in a manner such that it can rotate about the lever axis 10. In order to release the journal 7 from the locking element 1, it is necessary for a torque to be exerted on the locking element 1, for which purpose an external force acts, in particular, on the guide element 5 which therefore acts as a lever for the locking element 1.

Figure 1B:
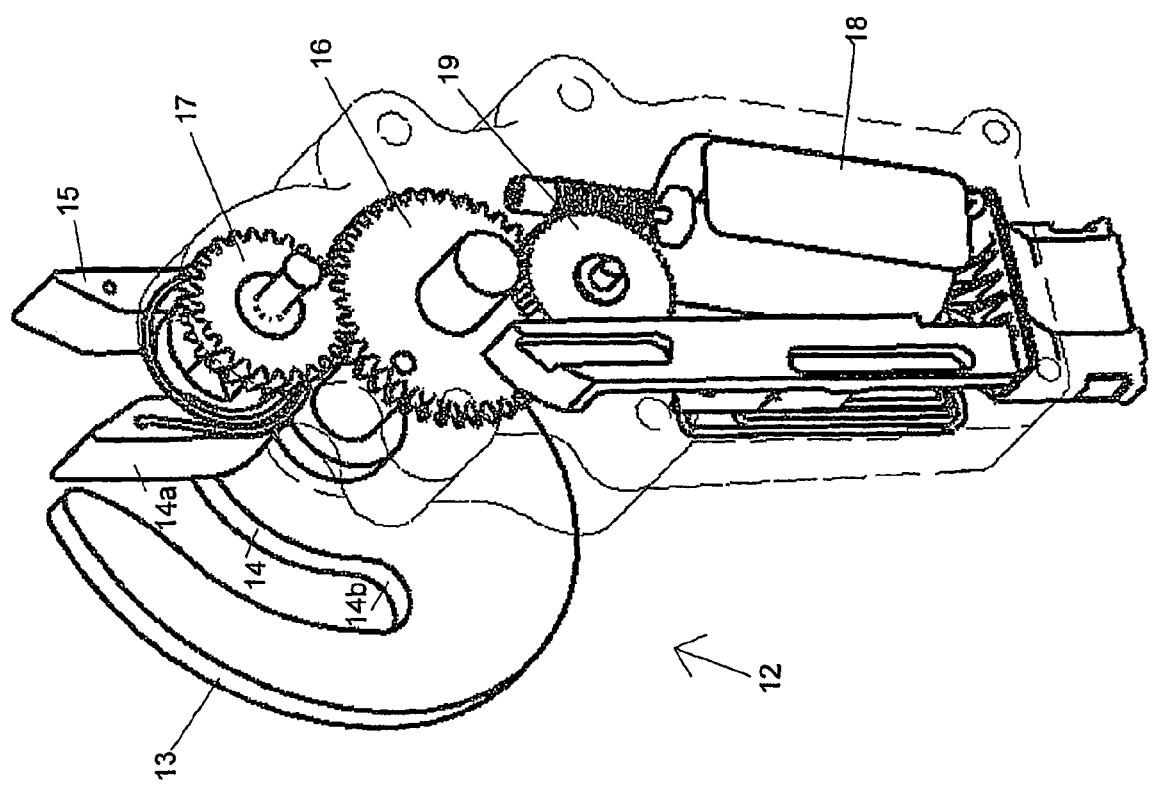
FIG. 1b shows a perspective view of an actuating device for the locking element from FIG. 1a, FIG. 2 shows a perspective view of the locking unit with the actuating device from FIG. 1b and the locking element from FIG. 1a in an intermediate position.

FIG. 1b shows an actuating device 12 for the locking element 1 from FIG. 1, with the actuating device 12 being fitted to a support (not illustrated). The actuating device 12 comprises a pivoting hook 13 with an indentation 14 having an open end 14a and a closed end 14b. The actuating device 12 furthermore comprises a U-shaped receptacle 15 which is configured with respect to the guide element 5 (FIG. 1a) in such a manner that the side surfaces 5a of the guide element 5 can be held in an essentially form-fitting manner between the limbs of the U. The U-shaped receptacle 15 is connected in a rotationally fixed manner to a first gearwheel 17 in so far as an angle-limiting free movement is incorporated between the receptacle 15 and the first gearwheel 17 in order to retard the movements with respect to each other. The pivoting hook 13 interacts with a second gearwheel 16, with the first gearwheel 17 merging with the second gearwheel 16. The actuating device 12 is assigned a drive 18 which sets a third gearwheel 19, which engages together with the second gearwheel 16, into rotation.

Figure 2:
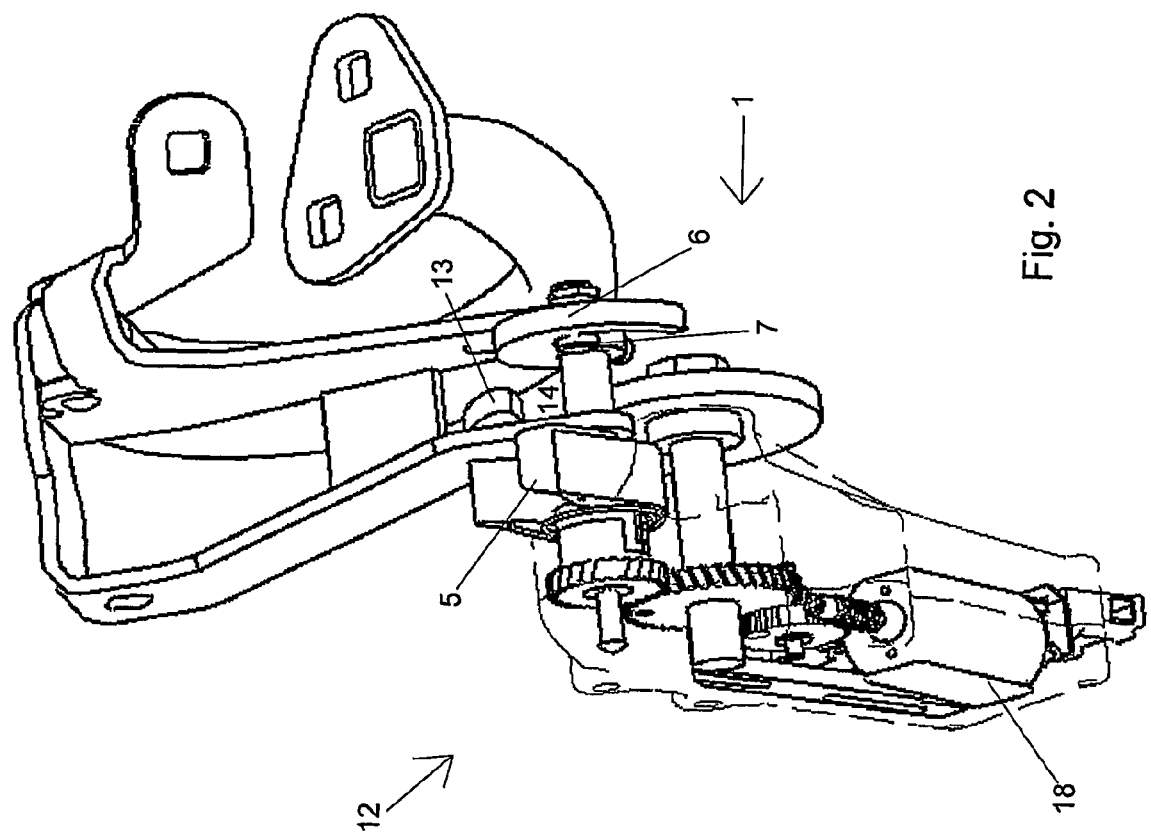

FIG. 2 shows a locking unit, which comprises the locking element 1 from FIG. 1a and the actuating unit 12 from FIG. 1b, in a position in which an operative connection is produced between the drive 18 and the locking element 1, and therefore the locking element 1 can be actuated by means of the drive 18. In the position illustrated in FIG. 2, the guide element 5 of the locking element 1, which guide element is designed as a driver, is held by the side surfaces 5a in the U-shaped receptacle 15 of the actuating device 12. The journal 7 is still engaged around by the elongate section 6 of the locking element 1, and the pin 4 of the locking element 1 is not yet engaged over by the pivoting hook 13, and therefore the pin 4 is not yet accommodated in the indentation 14. It should be noted that an operative connection occurs only between the guide element 5 of the locking element 1, which guide element is designed as a driver, and the U-shaped receptacle 15 of the actuating device 12.

Figure 3A:
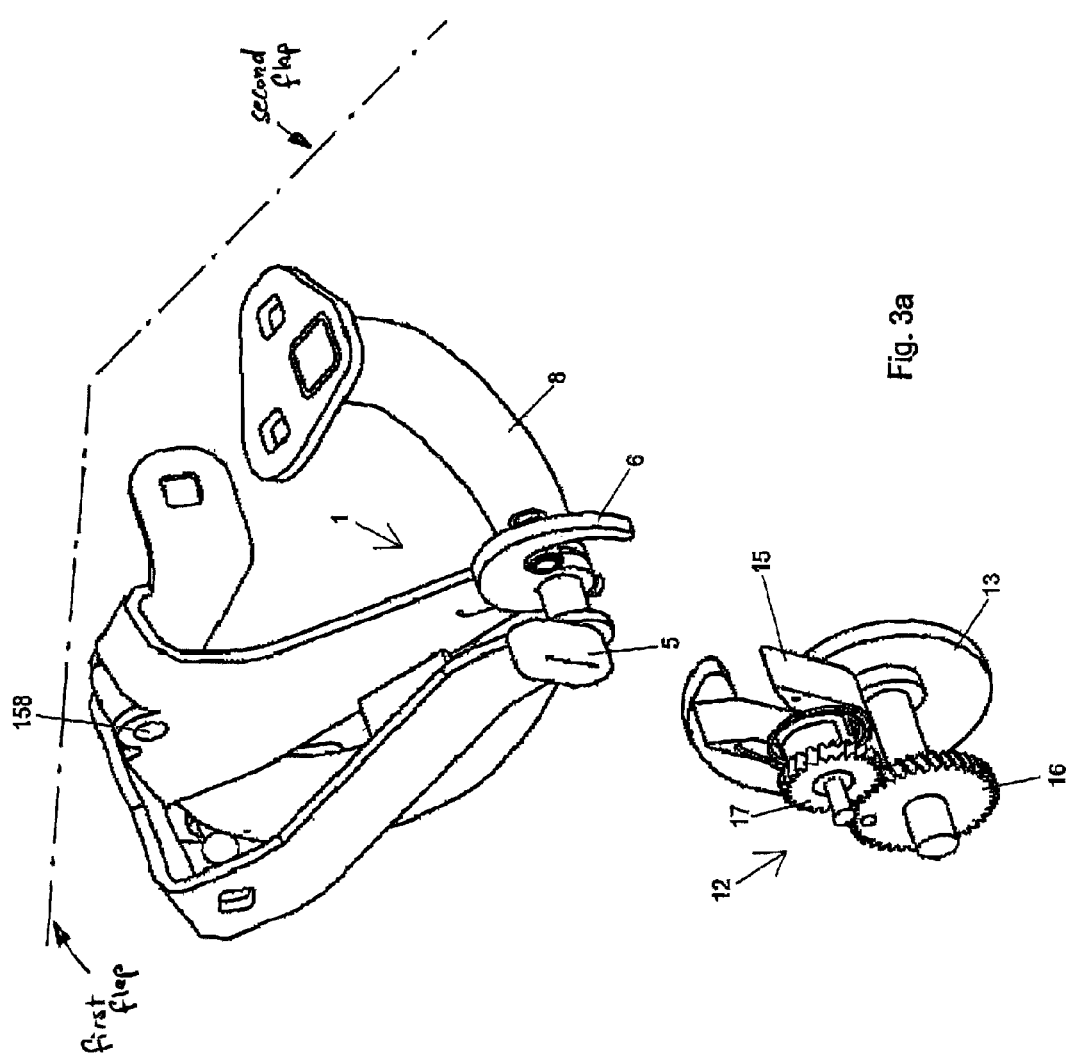
FIG. 3a shows a perspective view of the actuating device from FIG. 2 in a first position.

FIG. 3a shows the locking device in a first position, in which the actuating device 12 and the locking element 1 are not in operative engagement. The locking element 1 is fastened rotatably to the projection 11 of the first flap (not illustrated) and engages by means of the section 6 over the journal 7 fastened to the arm 8 of the second flap (not illustrated). It should be noted that the second flap is articulated rotatably about an axis of rotation 158 on the first flap, the axis of rotation 158 of the second flap on the first flap being at a distance from the journal 7, and therefore the journal 7, which is engaged around by the locking element 1, prevents a rotation of the second flap about its axis of rotation on the first flap such that the first flap and the second flap are coupled to form a rigid unit. Since the first flap, for its part, is articulated rotatably about an axis of rotation (not illustrated) on the support, in the first position illustrated in FIG. 3a the assembly comprising the first flap and the second flap can be pivoted as a whole with respect to the support about the axis of rotation of the first flap.

Figure 3B:
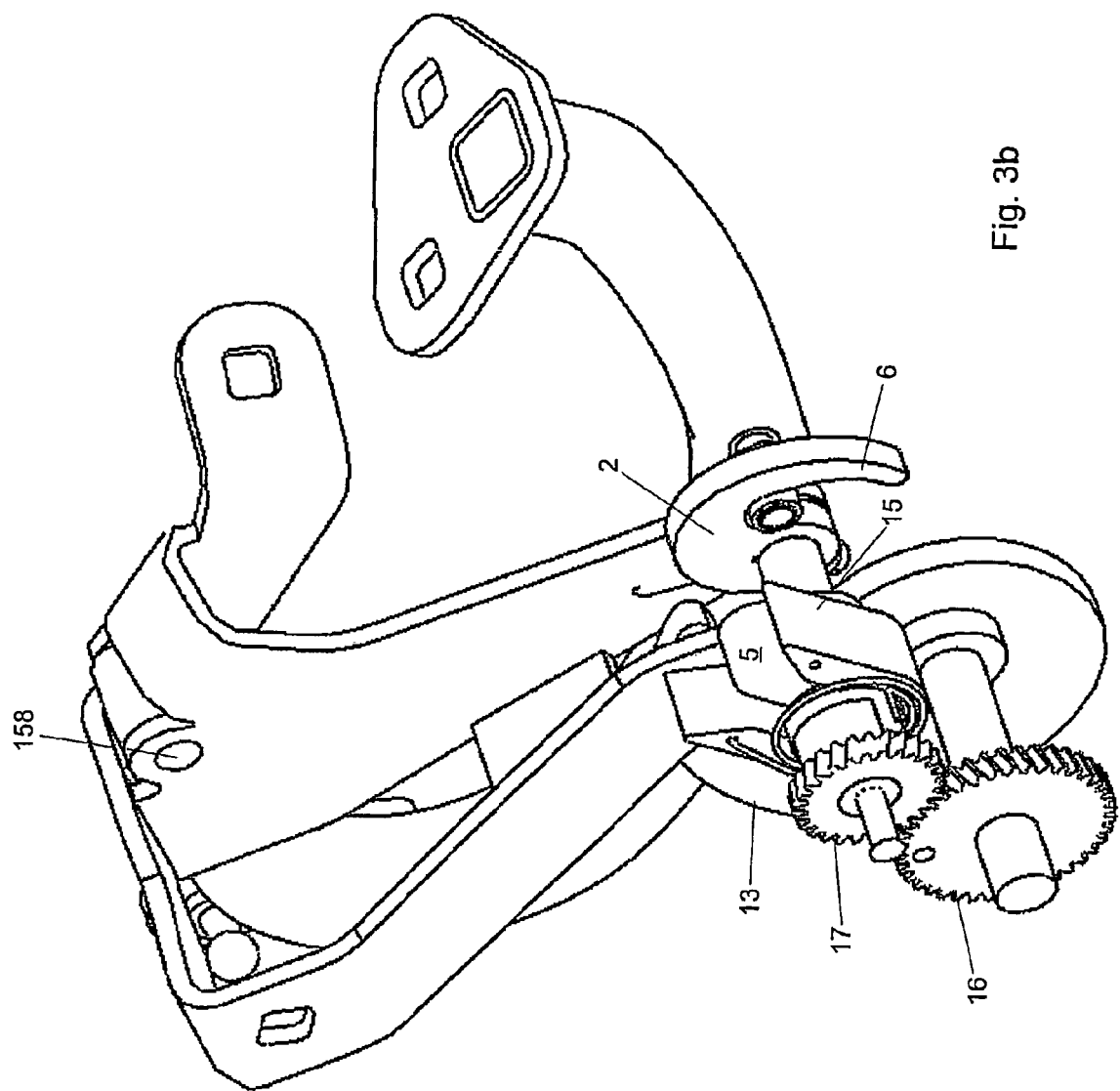
FIG. 3b shows a perspective view of the actuating device from FIG. 2 in the intermediate position.

The position in FIG. 3b essentially corresponds to the position which is illustrated in FIG. 2 and in which the actuating device 12 enters into operative connection with the locking element 1 via the guide element 5 which engages in the U-shaped receptacle 15 of said actuating device.

FIG. 3c shows a second position of the locking unit, after the actuation thereof because of the drive 18. In comparison to the position illustrated in FIG. 3b, the U-shaped receptacle 15 is rotated in the counterclockwise direction and, as a result, the locking element 1 is likewise rotated in the counterclockwise direction in such a manner that the journal 7 on the arm 8 of the second flap has come out of engagement with the section 6 of the locking element 1 and is therefore released such that the second flap is only still mounted pivotably at its axis of rotation on the first flap and is therefore released for pivoting in relation to the first flap. Owing to the opposed movement of the two gearwheels 16 and 17, the pivoting hook 13 is pivoted in the clockwise direction and the pin 4 of the locking element 1 is accommodated in the closed end 14b of the indentation 14. Overall, the locking element 1 and therefore also the first flap are fixed on the support, with a pivoting of the first flap about its axis on the support no longer being possible in the second position.

Figure 4:
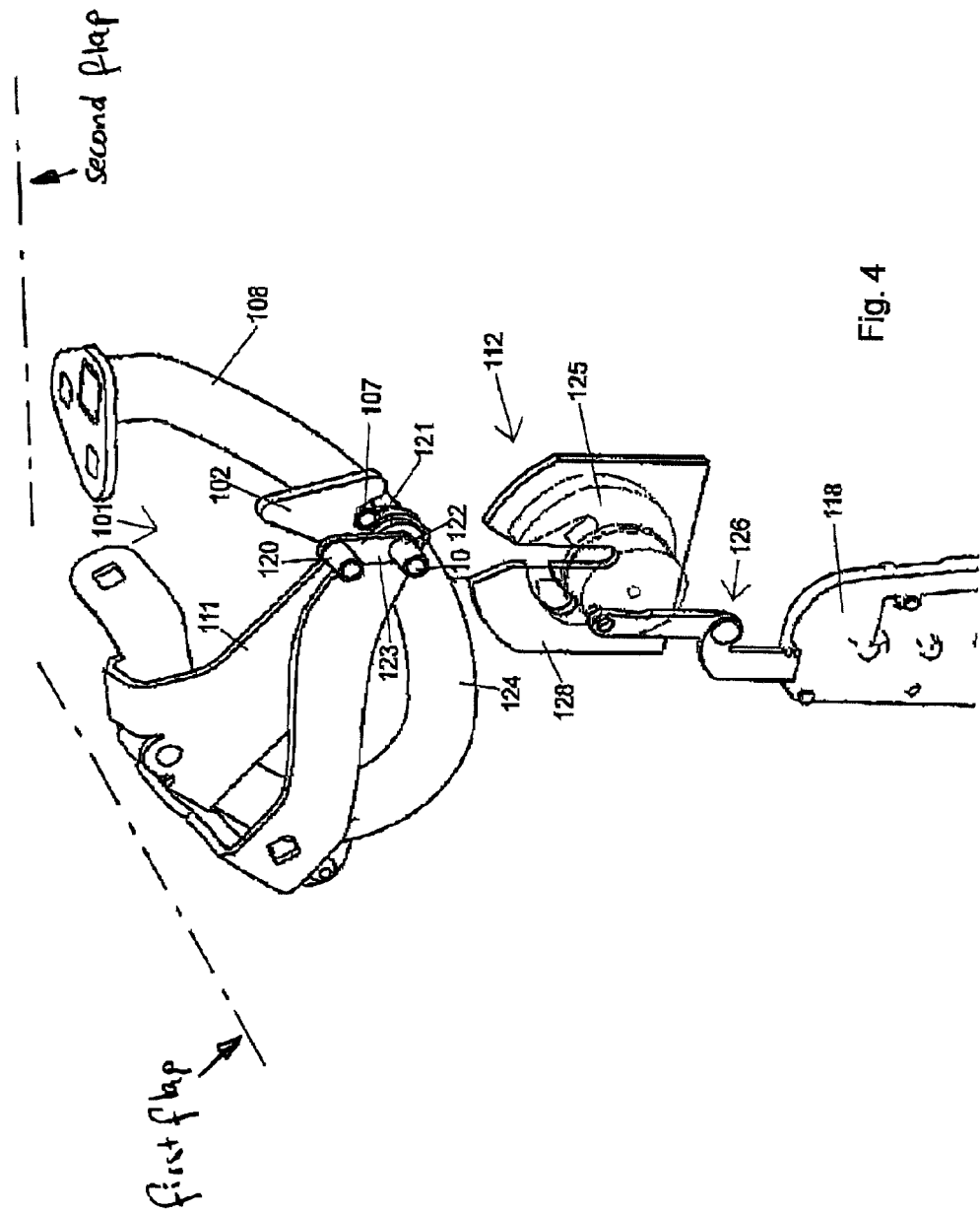
FIG. 4 shows a perspective view of a first exemplary embodiment of a locking unit according to the invention in a first position.

FIG. 4 shows the first exemplary embodiment, wherein a journal 107, which is engaged around by a locking element 101, is arranged on an arm 108 which is connected rigidly to a second flap (not illustrated). A body 102 of the locking element 101 is designed comparably to the body 2 of the locking element 1 from FIG. 1 to FIG. 3c and has an introductory slot 102 which, at one end, receives part of the journal 107 in an approximately form-fitting manner. The locking element 101 differs from the locking element 1 in so far as the locking element 101 has a driver which is designed as a cylindrical bolt 120 and is connected rigidly via a web 121 to a further, cylindrical guide pin 122, thus forming a lever 123 which is rotatable about an axis of rotation 110 which essentially corresponds to an axis 124 of the guide pin 122. The guide pin 122 is connected in a rotationally fixed manner to the body 102 of the locking element 101, and therefore a force which acts on the bolt 120 permits rotation of the locking element 101. In this case, the cylindrical bolt 120 is designed as a handle of the lever 123 which is rotatable about the axis of rotation 110. The locking element 101 is held rotatably on a projection 111 of the first flap (not illustrated specifically).

FIG. 4 furthermore shows an actuating device 112 for the locking element 101. The actuating device 112 comprises a locking disk 125 which can be driven by a drive 118 via a mechanism 126 such that it rotates, with the locking disk 125, in the first exemplary embodiment, being mounted rotatably on the support, specifically the bodywork of the motor vehicle, in a manner such that it can rotate about a locking disk axis 127, for which purpose the mechanism 126 acts on the locking disk 125 at a distance from the locking disk axis 127. In addition to the locking disk 125, the actuating device 112 comprises a locking plate 128 which is arranged fixed to the support. In the illustration of FIG. 4, the locking plate 128 largely covers the locking disk 125.

FIG. 4a shows the locking disk 125 and the locking plate 128 from FIG. 4, with the viewing direction along the locking disk axis being selected in a direction opposite to FIG. 4 such that the locking disk 125 can be seen in front of the locking plate 128. The locking disk 125 comprises an essentially triangular body 129, the corners of which are rounded. An elongated hole 130 is arranged on the body 129 of the locking disk 125, the elongated hole 130 having a first, open end 131 and a second, closed end 132. The second end 132 of the elongated hole 130 is of essentially semicircular configuration. The locking disk 125 furthermore comprises a blind hole 133 with a first, closed end 134 and a second end 135, the second end 135 of the blind hole 133 coinciding with the first end 131 of the elongated hole 130. The first end 134 of the blind hole 133 is provided with an essentially semicircular contour, with an imaginary center point of the semicircle lying on the locking disk axis 127. At the first, open end 131 of the elongated hole 130, the latter is widened approximately in the manner of a funnel and forms a guide surface 136. At the first end 131 of the elongated hole, the body 129 forms an introductory edge 137.

FIG. 4a shows the locking plate 128 with a body 138 and a bore 139, the first, open end 140 of which is partially covered in FIG. 4a by the locking disk 125 and the second, closed end 141 of which is of essentially semicircular design. The locking plate 128 furthermore comprises an introductory opening 142 with a first, open end 143 and a second, closed end 144. In the first position, illustrated in FIG. 4a, of the locking unit, the locking disk 125 is oriented with respect to the locking plate 128 in such a manner that the blind hole 133 of the locking disk 125 largely comes to overlap with the introductory opening 143 of the locking plate 128 along a sight line defined by the locking disk axis 127; in this case, a wall section 145 of the blind hole 133 of the locking disk 125 covers the first, open end 140 of the bore 139 of the locking plate 128. Furthermore, a wall section 146 of the introductory opening 143 of the locking plate 128 covers the first, open end 131 of the elongated hole 130 of the locking disk 125.

FIG. 4a furthermore shows the bolt 120, which is provided as the driver, and the guide pin 122, which are connected rigidly to each other via the web 121 and serve overall as a lever 123 for the actuation of the locking element 101 (not illustrated), with the bolt 120 which is provided as the driver being designed as the handle of the lever and being arranged at a distance from the lever axis 110.

FIGS. 5 and 5a show the locking unit in the first intermediate position. The locking disk 125 is rotated relative to the support by the drive 118 in the counterclockwise direction about the locking disk axis 127 in such a manner that the bolt 120 which is designed as the driver is arranged at the second, closed end 132 of the elongated hole 130 of the locking disk 125. The guide pin 122 is accommodated at the second, closed end 134 of the blind hole 133 of the locking disk 125 and at the second, closed end 144 of the introductory opening 142 of the locking plate 128 in such a manner that the axis 124 of the guide pin 122 essentially lies as an extension or continuation of the locking disk axis 127. The locking element 101, only part of which is visible in FIG. 5, has not changed its position in comparison to the position shown in FIG. 4, and therefore the first flap and the second flap are still coupled to the unit. However, the introductory edge 137 or the guide surface 136 of the elongated hole 130 of the locking disk 125 engages over the first, open end 143 of the introductory opening 142 of the locking plate 128 in such a manner that the bolt 120 which is designed as the driver is unable to move out in a direction which is approximately provided by an imaginary connecting line between the bolt 120 and the guide pin 122 (and which approximately corresponds to the longitudinal extent of the web 121 (which cannot be seen) from FIG. 4). The bolt 120 is furthermore located at the first, open end 140 of the bore 139 of the locking plate 128.

Figure 6:
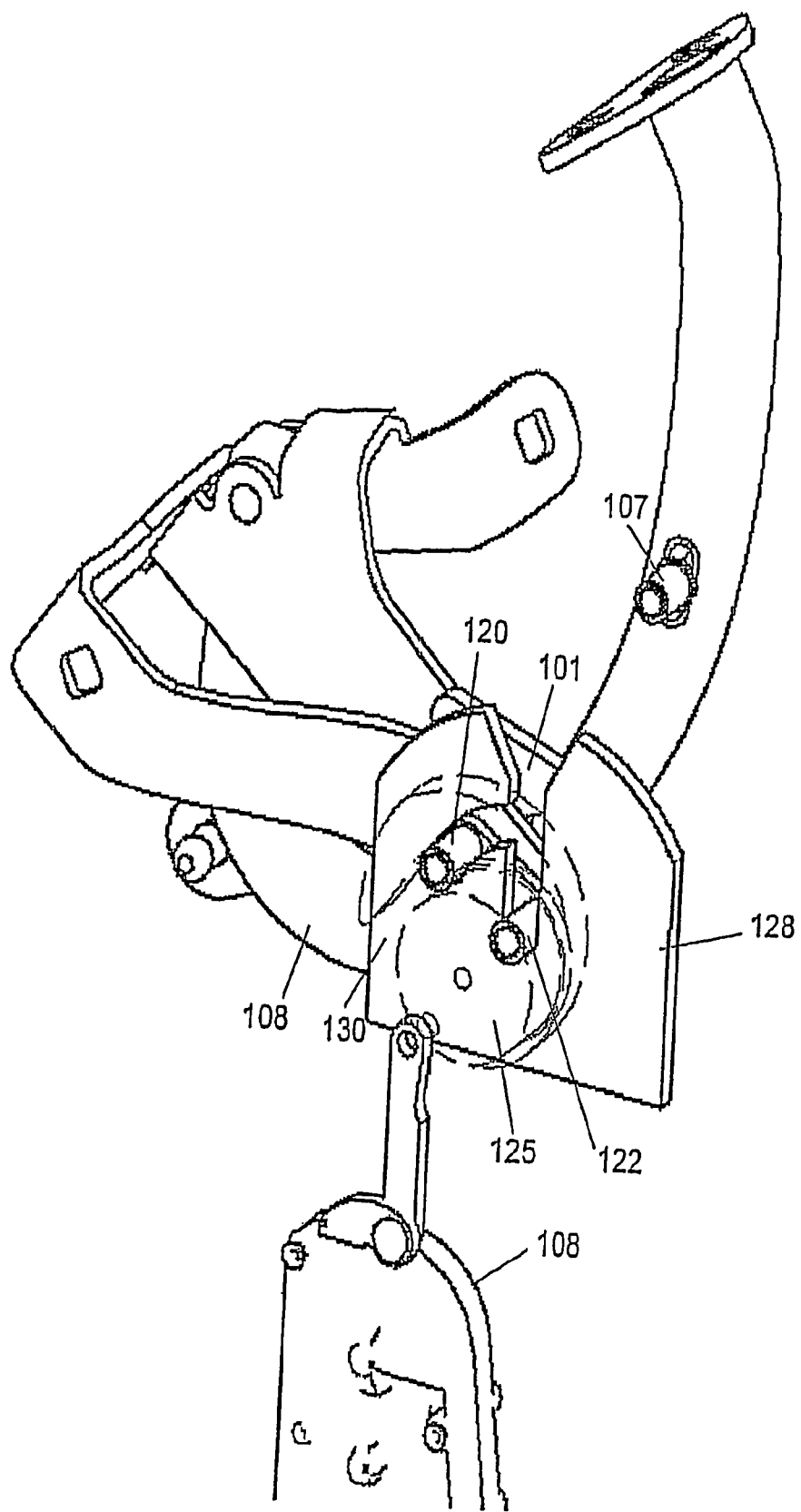
FIG. 6 shows a perspective view of the first exemplary embodiment from FIGS. 4 to 5a in a second position.
Figure 6A:
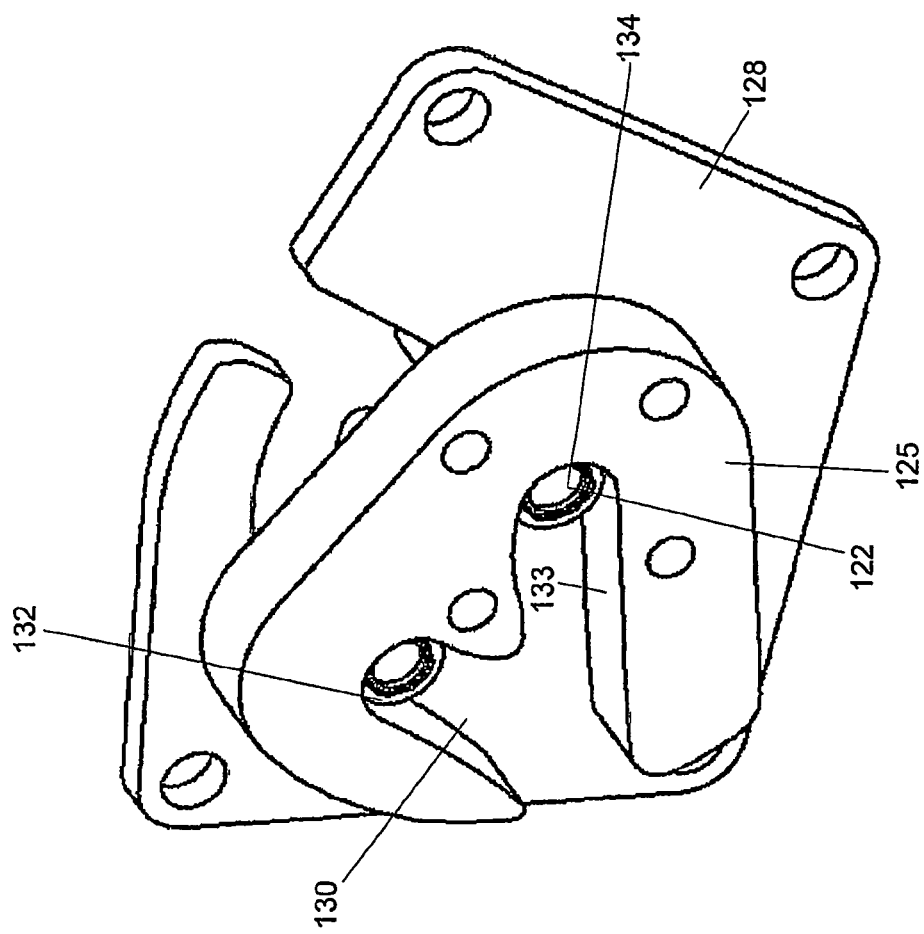
FIG. 6a shows a perspective view of an enlarged detail of the first exemplary embodiment from FIG. 6.

FIGS. 6 and 6a show the locking unit in the second position. In this case, the driver which is designed as a bolt 120 is arranged at the second, closed end 132 of the elongated hole 130 of the locking disk 125. In comparison to the position illustrated in FIGS. 5 and 5a, the locking disk 125 is rotated further in the clockwise direction (to the left during locking) about the locking disk axis 127. The bolt 120 is arranged at the second, closed end 141 of the bore 139 of the locking plate 128. In comparison to the position illustrated in FIGS. 5 and 5a, the position of the guide pin 122 at the first, closed end 134 of the blind hole 133 of the locking disk 125 and at the second, closed end 144 of the introductory opening 142 of the locking plate 128 is unchanged.

As is apparent in FIG. 6, the locking element 101, only part of which can be seen, is rotated to the left in the clockwise direction in such a manner that the journal 107 on the arm 108 is no longer engaged around and the second flap is released from the first flap.

Figure 7:
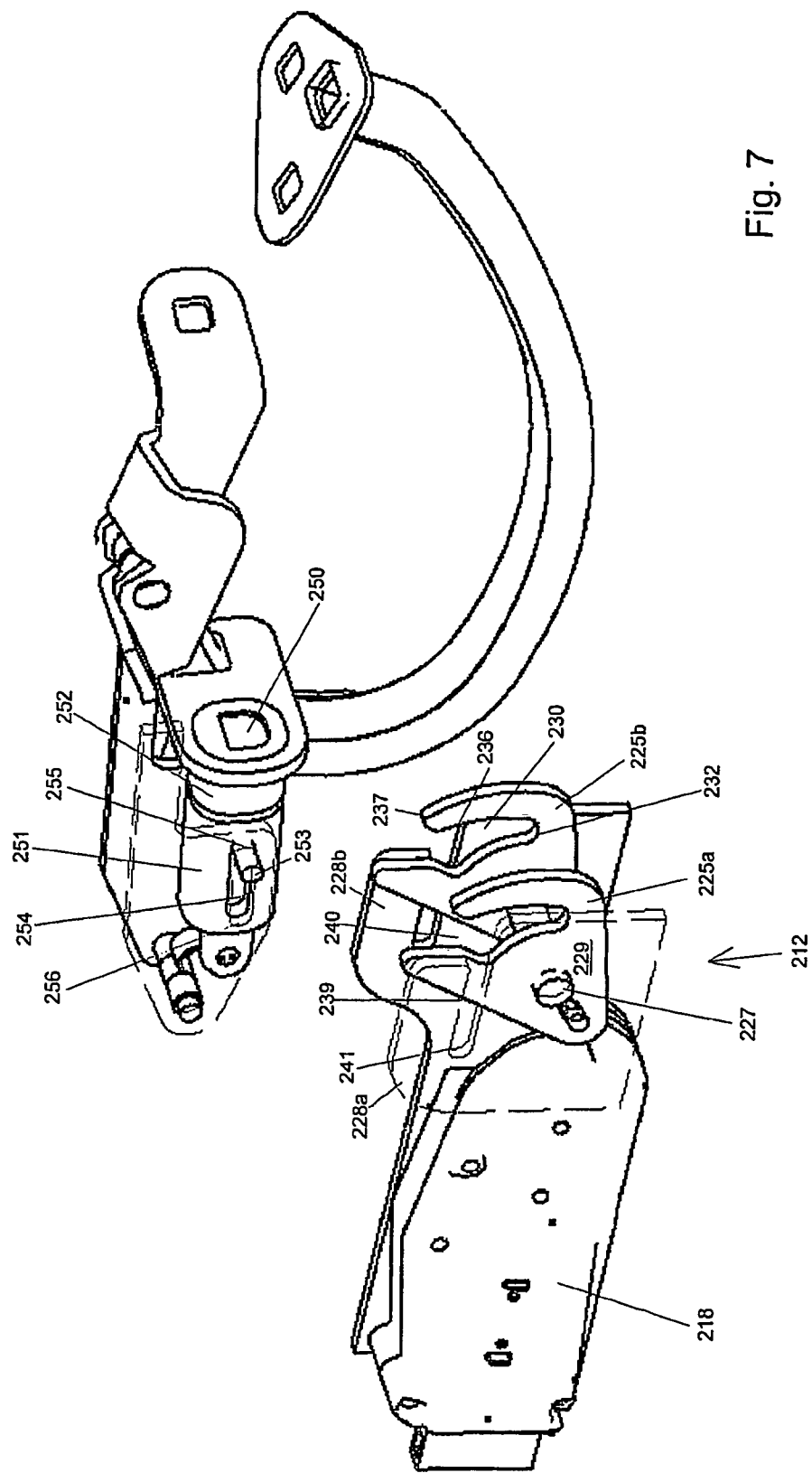
FIG. 7 shows a perspective view of a second exemplary embodiment of a locking unit according to the invention in a first position.

FIG. 7 shows the second exemplary embodiment of a locking unit which comprises a locking element 201 arranged on a first flap (not illustrated specifically) and an actuating device 212 assigned to the locking element 201, with it being possible for the actuating device 212 to be driven by a motorized drive 218.

The locking element 201 comprises a slide 250 which is mounted in a longitudinally displaceable manner in a receptacle 251 coupled fixedly to the first flap. In the first position, the slide 250 passes in an essentially form-fitting manner through a guide section 252, which is arranged fixedly on the second flap, such that the first flap and the second flap are coupled to form a rigid unit by the slide 250 passing through the receptacle 251 and the guide section. A laterally protruding pin 253 is arranged on the slide 250 and is guided in a longitudinally displaceable manner in a guide 254, the guide 254 being designed in the manner of an elongated hole, with a first, closed end 255 and a second, closed end 256, the pin 253 of the slide 250 being arranged at the first end 255 of the guide 254 in the first position of the locking unit. The pin 253 is designed as a driver for the actuating device 212.

The actuating device 212 comprises a first locking plate 228a and a second locking plate 228b, which are both fastened to the support (not illustrated), and a first locking disk 225a, which is fastened rotatably to the first locking plate 228a, and a second locking disk 225b, which is fastened rotatably to the second locking plate 228b, with the first locking disk 225a being connected rigidly to the second locking disk 225b and being rotatable about a common locking disk axis 227. The first locking disk 225a and the first locking plate 228a are constructed mirror-symmetrically to an imaginary center plane with respect to the second locking disk 225b and the second locking plate 228b, and therefore only the construction of the first locking plate 228a and that of the second locking disk 225b are described below, with the understanding that the second locking plate 228b and the first locking disk 225a are of comparable configuration. It should also be noted that the first locking disk 225a or the first locking plate 228a interacts with the pin 253 (which can be seen in FIG. 7) of the slide 250 of the locking element 201. In addition, the locking element 201 comprises a further slide 253', which is concealed in FIGS. 7 to 9, of the slide 250 which interacts with the second locking plate 228b or the second locking disk 225b.

The first locking plate 228a comprises a body 229 with a bore 239 which has a first, open end 240 and a second, closed end 241. The second locking disk 225b comprises a body 229 which has an elongated hole 230 with a first, open end 231 and a second, closed end 232. At the first end 231, the elongated hole 230 has an introductory edge 237 which is adjoined along the extent of the elongated hole 230 by a guide surface 236, with the elongated hole 230 tapering along the guide surface 236 to the second, closed end 232 of the elongated hole 230.

In the first position, illustrated in FIG. 7, of the locking unit, the pin 253 of the slide 250, which pin is designed as a driver, is not in engagement with the actuating device 212. The locking disks 225a and 225b, which can be driven by motor and have the elongated holes 230, are oriented with respect to the locking plates 228a, 228b in such a manner that first ends 231 of the elongated holes 230 of the locking disk 225a (225b) together with the first ends 240 of the bores 230 of the locking plate 228a (228b) respectively form a receptacle for the pin 253 and for the further pin (which cannot be seen) of the slide 250.

Figure 8:
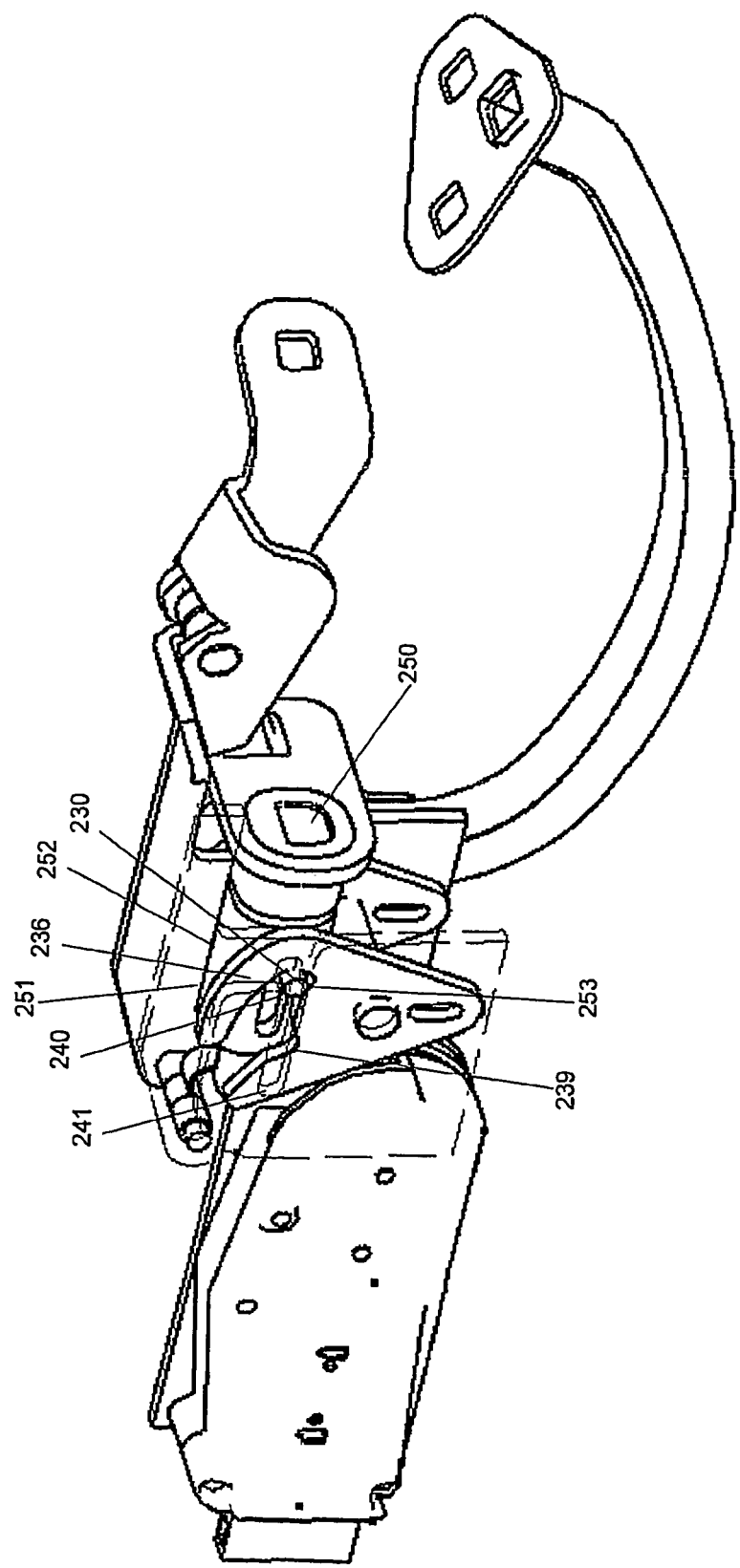
FIG. 8 shows a perspective view of the second exemplary embodiment from FIG. 7 in a position approximate to an intermediate position.

FIG. 8 shows the locking unit in a position which is approximate to the intermediate position and in which the slide 250 passes both through the receptacle 251 on the first flap and through the guide section 252 of the second flap and therefore fixes the two flaps to each other. The pin 253 is located at the first, open end 240 of the bore 239 of the locking plate 228a or 228b. In comparison to the illustration shown in FIG. 7, on account of the motorized drive 218, the locking disk 225a, 225b is pivoted in the counterclockwise direction, and therefore the pin 253 is accommodated within the elongated hole 230 and is arranged there between the first, open end 231 and the second, closed end 232. The pin 253 is in contact here with the guide surface 236 of the elongated hole 230. The intermediate position is only reached when the pin 253 arrives at the second, closed end 232 of the elongated hole 230, and therefore only then is there an operative connection between the drive 218, via the elongated hole 230 and the pin 253, and the locking element 201. Even before the intermediate position is reached, the introductory edge 237 has completely engaged over the pin 253, and therefore it is no longer possible for the pin 253 to exit from the receptacle formed beforehand by the first end 231 of the elongated hole 230 and the first end 240 of the bore 239.

Figure 9:
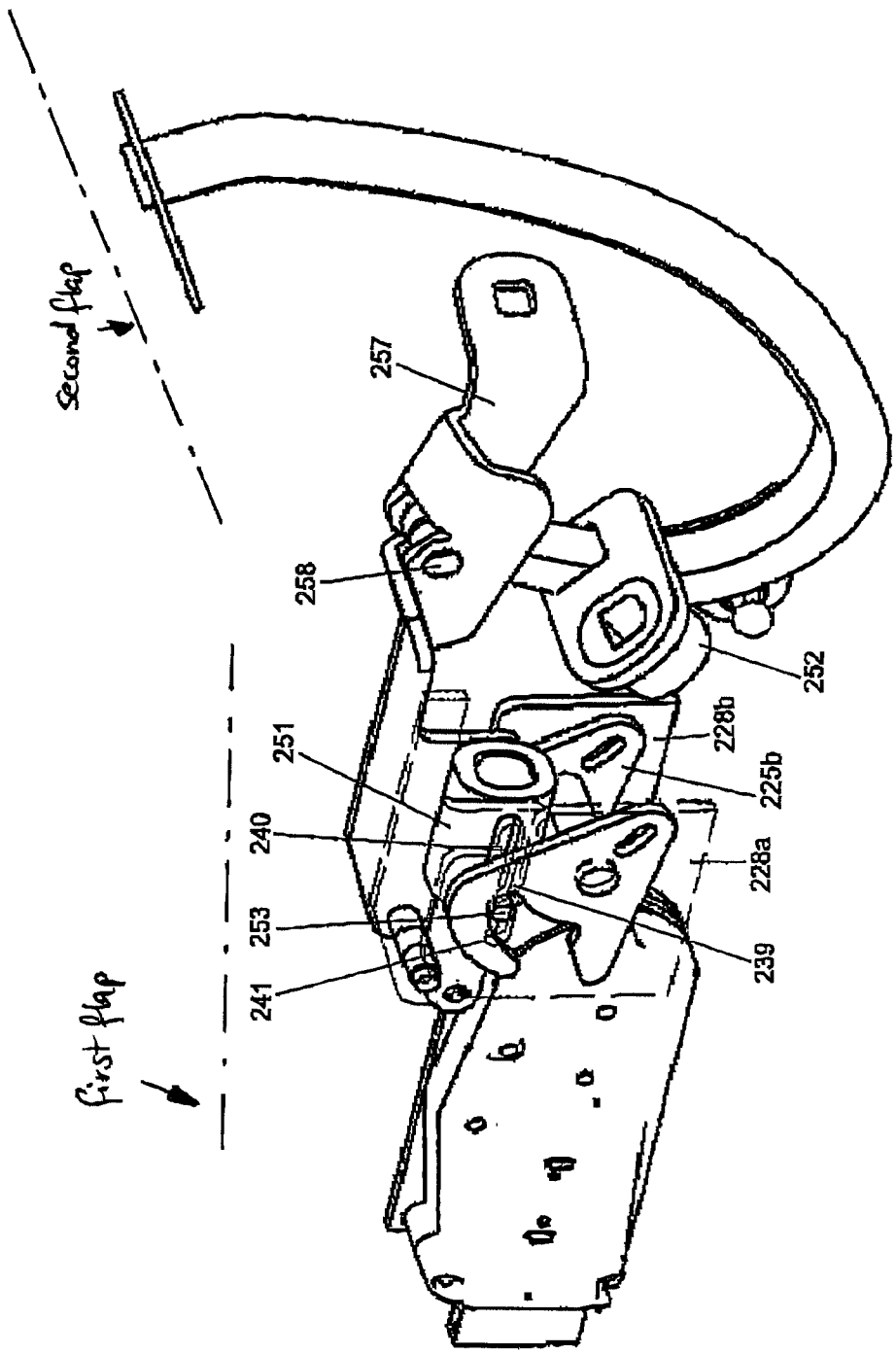
FIG. 9 shows a perspective view of the second exemplary embodiment from FIGS. 7 and 8 in a second position.

FIG. 9 shows the locking unit in the second position, with the slide 250 being longitudinally displaced in the receptacle 251 on the first flap in such a manner that the slide 250 no longer passes through the guide section 252 on the second flap. The second flap is therefore no longer fixed to the first flap in the region of the slide 250. Since the second flap is articulated rotatably about an axis 258 on a projection 257 of the first flap, the second flap can be pivoted relative to the first flap about the axis 258.

In FIG. 9, it can furthermore be seen that, in the second position, the pin 253 is arranged in the vicinity of the second, closed end 241 of the bore 239 of the locking plate 228a (or in a corresponding manner for the further pin (which cannot be seen) for the locking plate 228b). An end stop for the pin 253 is provided by the second end 256, concealed in FIG. 9, of the guide 254 such that the guide 254 determines the displaceability of the pin 253 in the bore 239. FIG. 9 does not illustrate the first locking disk 225a which has grasped the pin 253 at the second end 232 of the elongated hole 230 (FIGS. 7 and 8) in the intermediate position and has guided it into the second position which can be seen in FIG. 9. Only part of the second locking disk 225b can be seen.

The invention operates as follows, with the first exemplary embodiment (FIG. 4 to FIG. 6) being discussed first:

Starting from the first position of the locking unit, which position is illustrated in FIGS. 4 and 4a and in which the first flap and the second flap are coupled to form a rigid unit, the locking element 101 is moved relative to the actuating device 112 in such a manner that the guide pin 122 passes through the blind hole 133 of the locking disk 125 and the introductory opening 142, which is oriented with respect thereto, of the locking plate 128, with the guide pin 122 being brought in the vicinity of the first, closed end 134 of the blind hole 133 and the second, closed end 144 of the introductory opening 142, and with the guide pin 122 also having a small amount of play with respect to the second end 144 of the introductory opening 142. In this first position of the locking unit, the bolt 120 which is designed as a driver is located at the first, open end 131 of the elongated hole 130 and at the first, open end 140 of the bore 139 of the locking plate 128.

During the further course, the motorized drive 118 is actuated in order to rotate the locking disk 125 in the counterclockwise direction about the locking disk axis 127. In the process, the introductory edge 137 of the locking disk 125 engages over the bolt 120, which is designed as a driver, and over the first, open end of the blind hole 133, the bolt 120 coming into contact with the guide surface 136 of the elongated hole 130 of the locking disk 125 during the further course of rotation of the locking disk 125. Since the elongated hole 130 tapers in the region of the guide surface 136, the bolt 120 and, together with the latter, the guide pin 122 are essentially pressed along the longitudinal extent of the blind hole 133, with the play of the guide pin 122 in relation to the first, closed end 134 of the blind hole 133 being eliminated. The object of the introductory edge 137 and of the guide surface 136 is to pull the bolt 120 into the introductory opening 142 of the locking plate 128 until it is in front of the first, open end 140 of the bore 139. Apart from the action of the guide surface 136 on the bolt 120, no substantial force is exerted on the latter, and therefore the bolt 120, which acts as a handle of the lever 123, still does not permit any rotation of the locking element 101. The transmission of a torque to the lever 123 is also made difficult by the fact that the locking disk axis 127 is at least approximately aligned with the axis 124 of the guide pin 122. Owing to the initial small amount of play of the guide pin 122 with respect to the second, closed end 134 of the blind hole 133 of the locking disk 125, it is ensured that an exact orientation of the axis 124 of the guide pin 122 relative to the locking disk axis 127 is possible.

During the further course of the movement of the locking disk 125, the bolt 120 passes to the second, closed end 132 of the elongated hole 130. In this intermediate position of the locking unit, an operative connection is produced between the drive 118 and the bolt 120, which acts as a handle of the lever 123, on account of which operative connection the bolt 120 is moved and therefore the lever 123 is pivoted in such a manner that the locking element 101, which is coupled in a rotationally fixed manner to the lever 123, is rotated in the counterclockwise direction in such a manner that the locking element 101, which is held in an at least indirectly rotatable manner on the first flap, begins to release the journal 107, which is fastened at least indirectly to the second flap, and therefore the second flap is no longer coupled to the first flap in the region of the journal 107. In the process, the first, open end 135 of the blind hole 133 of the locking disk 125 is engaged over by one side of the elongated hole 130, as a result of which the bolt 120 can no longer exit from the blind hole 133 or the elongated hole 130. In the intermediate position, when the operative connection between the bolt 120 and the locking disk 125 is produced by the bolt 120 being held at least in an approximately form-fitting manner at the second, closed end 132 of the elongated hole 130 of the locking disk 125, the guide pin 122 is located at the first, closed end 134 of the blind hole 133 and is accommodated there in an approximately play-free and form-fitting manner such that the axis 124 of the guide pin 122 is aligned with the locking disk axis 127, and an operative connection between the locking element 101 is brought about exclusively by the bolt 120 being carried along by the locking disk 125 and cannot be interfered with by a force acting on the guide pin 122. The form-fitting mounting of the guide pin 122 between the closed end 134 of the blind hole 133 of the locking disk 125 and the closed end 144 of the introductory opening 142 of the locking plate 138 fixes the first flap on the support.

The bolt 120 is guided by the locking disk 125 along the bore 139 which is arranged in the locking plate 128 and at the first, open end 140 of which the bolt 120 is arranged in the first position and in the intermediate position and at the second, closed end 141 of which the bolt 120 is arranged in the second position of the locking unit. Since the bolt 120 is designed as a handle of the lever 123 of the locking element 101, in the second position the locking element 101 is rotated in such a manner that the journal 107 is released and the second flap is no longer coupled to the first flap in the region of the journal 107. However, the bolt 120 is accommodated on the locking plate 128, which is fastened to the support, in such a manner that the bolt 120 cannot readily pass through the bore 139 in the opposite direction, and therefore the first flap, on which the bolt 120 is at least indirectly rotatably held, is fixed to the support in the region of the bolt 120. Since the bolt 120 essentially describes a rotation about the locking disk axis 127, the bore 139 of the locking plate 128, which bore receives the bolt, is configured as a circular segment, which is in the manner of an elongated hole, of an imaginary circle about the locking disk axis 127.

If the bringing of the first and second flaps from the first into the second position by means of the locking unit has been described above, then, by reversing the direction of rotation of the locking disk 125, the locking unit can be brought from the second position back into the first position. For this purpose, the locking disk 125 rotates in the counterclockwise direction, and therefore the bolt which is located at the second end 141 of the bore 139 is guided by the wall section 145 of the locking disk 125 through the bore 139 to the first, open end 140 thereof, with the guide pin 122 remaining essentially fixed in position. After the end of the rotation of the locking disk 125, the bolt 120 is located at the first end 140 of the bore 139 and at the same time at the first, open end 131 of the elongated hole 131 and the second, open end 135 of the elongated hole 133 while the introductory edge 137 of the locking disk 125 has released the first end 140 of the bore 139 to an extent such that the bolt 120 and the guide pin 122 can be brought out of engagement with the locking disk 125 and with the locking plate 128.

The second exemplary embodiment (FIGS. 7 to 9) differs from the first exemplary embodiment (FIG. 4 to FIG. 6) essentially in that the locking element 201 has a longitudinally displaceable slide 250 and no lever 123 to be actuated by rotation, and a locking element 101.

Starting from the first position of the locking unit, which position is illustrated in FIG. 7 and in which the first flap and the second flap are coupled to form a unit, the pin 253 is brought to the first, open end 240 of the bore 239 of the locking plate 228a or 228b, in which position the pin 253 is likewise located at the first, open end 231 of the elongated hole 230. In this position, the slide 250 passes both through the receptacle 251, which is assigned to the first flap, and through the guide section 252, which is assigned to the second flap, and thereby couples the two flaps to each other. If the locking disk 225a, 225b is now actuated, the introductory edge 237 engages over the pin 253 of the slide 250, with the elongated hole 230 being moved relative to the initially essentially positionally fixed pin 253 in such a manner that the pin 253 comes into contact with the guide surface 236 of the elongated hole 230, and therefore the pin 253 is pulled downward somewhat into the elongated hole 230. A lateral force which is required for displacing the slide 250 is initially not yet exerted on the pin 253 and therefore on the slide 250 (FIG. 7).

During the further course of the movement of the elongated hole 230, the pin 253 is received at the second, closed end 232 thereof, and therefore an operative connection is then produced between the drive 218, which drives the locking disk 225a, 225b, and the slide 250, which is connected fixedly to the pin 253. Starting from the intermediate position, in which the pin 253 is received at the second end 232 of the elongated hole 230, the pin 253 is guided by the elongated hole 230 and passes through the bore 239 in the locking plate 228*a*, 228*b*. In the intermediate position, the introductory edge 237 engages over the first, open end 240 of the bore 239 of the locking plate 228*a*, 228*b*, and therefore the pin 253 can no longer readily be brought back into the starting position. In particular, the first flap and the second flap are still fastened to each other in the intermediate position, but the two flaps are jointly fixed at least temporarily to the support via the pin 253.

The further movement of the pin 253 on account of the elongated hole 230 which guides it is limited by the pin 253 passing to the second end 256 of the guide 254. In this second position, the slide 250 has emerged from the guide section 252, which is assigned to the second flap, and releases the second flap with respect to the first flap in such a manner that the second flap can rotate about the axis 258. The first flap is fixed in the region of the pin 253 by the slide 250 which is fixed to the support and is assigned to the first flap via the receptacle 251.

Also in the second exemplary embodiment, by reversing the direction of rotation of the locking disk 225*a*, 225*b*, the pin 253 is moved out of the bore 239 of the locking plate 228*a*, 228*b* in order to bring the two flaps back from the second position into the first position by means of the locking device.

In the two exemplary embodiments described above, the locking disks 125 and 225*a* and 225*b* were each mounted rotatably on the support. However, it has to be understood that another type of mounting, in particular a longitudinally displaceable mounting of locking disks, can be provided, especially if the locking element is mounted in a longitudinally displaceable manner.

In the case of the two exemplary embodiments described above, the elongated hole 130, 230 of the locking disk 125 or 225*a* and 225*b* was in each case a cutout, which is open at one end, of an essentially ovally curved contour. It has to be understood that an elongated hole can also have a different contour. If, for example, in the case of the second exemplary embodiment, a vertically displaceable locking disk is provided, the elongated hole can have a triangular outline, for example in the form of a right-angled triangle, in which, in the first position, the driver is accommodated at the first edge between one of the legs and the hypotenuse, and, over the further course of the longitudinal movement of the locking disk, is guided along the hypotenuse of the triangle and, in the second position, is accommodated at the second edge between the other leg and the hypotenuse.

It furthermore has to be understood that, for a motor vehicle, the bodywork of which corresponds to the above-described support, a respective locking unit, as described above, can be provided on each side in a mirror-inverted manner with respect to a longitudinal center plane of the bodywork.

In the exemplary embodiments described above, in addition to the driven locking disk, a locking plate fastened to the support was provided, the locking plate receiving the driver in the bore. The locking plate here has the task of absorbing the forces in effect during the guidance of the driver. It has to be understood that a locking plate may also be omitted.

In particular, it is possible to guide the driver only by means of a driven locking disk. Specifically, the locking disk can be spring-mounted for this purpose on the support in the first position, with the driver initially pressing down the introductory edge of the locking disk, after which the locking disk springs back and, in the process, engages with the introductory edge over the driver in order to permit further secure guidance of the driver in the elongated hole. For the guidance of the driver, a fixed support of the locking disk on the support is required, for which purpose the initial, resilient mounting of the locking disk can be removed as soon as the driver is accommodated in the elongated hole. To switch between the resilient mounting and the fixed support of the locking disk on the support, a sensor mechanism can be provided which detects when the driver enters the elongated hole of the locking disk.

It furthermore has to be understood that the locking unit can comprise a sensor which determines whether the driver is located at the open end of the elongated hole, and therefore the locking disk can be set into motion. Such a sensor can be coupled to the drive of the locking disk in such a manner that the drive only sets the locking disk into motion when the sensor detects that the driver has reached a suitable position with respect to the elongated hole of the locking disk. It furthermore has to be understood that the same sensor, or else a further sensor, follows the movement of the driver and detects when it reaches the second position, in order to be able to output a signal that the locking of the flaps has been carried out correctly.

What is claimed is:

1. A locking unit for a first flap, a second flap and a support, comprising:
    a locking element which is held movably on the first flap and has a mechanical driver, and
    a drivable actuating device for moving the locking element,
    wherein the locking element, in a first position, couples the first flap to the second flap to form a unit,
    wherein the locking element, in a second position, releases the first flap from the second flap,
    wherein the locking element, in an intermediate position, fixes the first flap and the second flap together on the support,
    wherein an operative connection is producible between the mechanical driver of the locking element and the actuating device in the intermediate position,
    wherein the actuating device comprises a locking disk which is arranged movably on the support, and
    wherein the locking disk has an elongated hole with a first, open end and a second, closed end, with, in the first position, the mechanical driver being arranged at the first end of the elongated hole and, in the intermediate position, being arranged at the second end of the elongated hole,
    wherein the locking disk engages the mechanical driver in both the intermediate position and the second position, the locking disk being rotatable from the intermediate position to the second position to release the first flap from the second flap.

2. A locking unit for a first flap, a second flap and a support, comprising:
    a locking element which is held movably on the first flap and has a mechanical driver, and
    a drivable actuating device for moving the locking element,
    wherein the locking element, in a first position, couples the first flap to the second flap to form a unit,
    wherein the locking element, in a second position, releases the first flap from the second flap,
    wherein the locking element, in an intermediate position, fixes the first flap and the second flap together on the support,
    wherein an operative connection is producible between the mechanical driver of the locking element and the actuating device in the intermediate position, wherein the actuating device comprises a locking disk which is arranged movably on the support, and wherein the locking disk has an elongated hole with a first, open end and a second, closed end, with, in the first position, the mechanical driver being arranged at the first end of the elongated hole and, in the intermediate position, being arranged at the second end of the elongated hole, wherein a locking plate is fastened to the support, and wherein the locking plate has a bore through which the mechanical driver at least partially passes, wherein the locking disk engages the mechanical driver in both the intermediate position and the second position, the locking disk being rotatable from the intermediate position to the second position to release the first flap from the second flap.

3. The locking unit as claimed in claim 2, wherein the locking disk is mounted on the support in a manner such that it can rotate about a locking disk axis.

4. The locking unit as claimed in claim 2, wherein the locking element comprises a rotatably mounted lever, and wherein the mechanical driver is designed as a handle of the lever.

5. The locking unit as claimed in claim 4, wherein, in the second position, an axis of rotation of the lever is aligned essentially as an extension of the locking disk axis.

6. The locking unit as claimed in claim 4, wherein the locking disk has a blind hole with a first, closed end and a second, open end, and wherein the second end of the blind hole opens into the first end of the elongated hole of the locking disk.

7. The locking unit as claimed in claim 1, wherein the locking element is designed as a slide which is mounted in a longitudinally displaceable manner in a receptacle assigned to the first flap and, in the first position, passes through a guide section assigned to the second flap.

8. The locking unit as claimed in claim 7, wherein the mechanical driver is designed as a pin which protrudes laterally from the slide and is displaceable in a guide.

9. The locking unit as claimed in claim 8, wherein, in the second position, the pin is arranged at a second end of the guide.

10. The locking unit as claimed in claim 2, wherein the first end of the elongated hole has a guide surface with which the mechanical driver interacts in the first position.

11. The locking unit as claimed in claim 10, wherein the guide surface is designed as a partial tapering of the elongated hole.

12. The locking unit as claimed in claim 1, wherein the support is designed as the bodywork of a motor vehicle.

13. The locking unit as claimed in claim 12, wherein the first flap is designed as a tailgate of the motor vehicle, and wherein the tailgate is mounted on the bodywork in such a manner that it can pivot about a tailgate axis.

14. The locking unit as claimed in claim 13, wherein the second flap is designed as a trunk flap of the motor vehicle, and wherein the trunk flap is mounted on the tailgate in such a manner that it can pivot about a trunk flap axis.

15. The locking unit as claimed in claim 1, wherein in the second position, the mechanical driver is at the second end of the elongated hole.

16. The locking unit as claimed in claim 1, wherein the locking element includes a body, the body engaging a journal connected rigidly to the second flap in the first position and intermediate position, the journal being released from the body in the second position to release the first flap from the second flap.

17. The locking unit as claimed in claim 16, wherein the body includes a slot formed therein, the journal being in the slot in the first position and the intermediate position, the journal being release from the slot in the second position.

18. The locking unit as claimed in claim 1, wherein the locking element includes a pin connected to the mechanical driver, the pin and the mechanical drive both being engaged in the locking disk in both the intermediate and second positions.

19. The locking unit as claimed in claim 18, wherein the pin is stationary as the locking disk is rotated from the intermediate position to the second position to release the first flap from the second flap, the mechanical driver rotating about the pin as the locking disk is rotated from the intermediate position to the second position to release the first flap from the second flap.

20. The locking unit as claimed in claim 18, wherein the locking disk further includes a blind hole, the pin being in the blind hole in the intermediate position and the second position.

* * * * *